US012647965B2

(12) United States Patent
Lyu et al.

(10) Patent No.: US 12,647,965 B2
(45) Date of Patent: Jun. 2, 2026

(54) METHOD AND APPARATUS FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/999,758

(22) Filed: Dec. 23, 2024

(65) Prior Publication Data

US 2025/0126612 A1     Apr. 17, 2025

Related U.S. Application Data

(63) Continuation of application No. PCT/CN2023/093623, filed on May 11, 2023.

(51) Int. Cl.
| | |
|---|---|
| *H04W 72/121* | (2023.01) |
| *H04L 1/1812* | (2023.01) |
| *H04W 76/20* | (2018.01) |

(52) U.S. Cl.
CPC ......... *H04W 72/121* (2013.01); *H04L 1/1812* (2013.01); *H04W 76/20* (2018.02)

(58) Field of Classification Search
CPC . H04W 72/121; H04W 76/20; H04W 72/115; H04L 1/1812; H04L 1/1864; H04L 1/1822
See application file for complete search history.

(56) References Cited

U.S. PATENT DOCUMENTS

| | | | | |
|---|---|---|---|---|
| 2010/0257423 | A1* | 10/2010 | Kim ...................... | H04L 1/1874 |
| | | | | 714/E11.113 |
| 2018/0199359 | A1* | 7/2018 | Cao ...................... | H04L 5/0012 |
| 2021/0306110 | A1 | 9/2021 | Xu | |
| 2022/0061074 | A1* | 2/2022 | Babaei .................. | H04L 5/0053 |
| 2022/0200740 | A1 | 6/2022 | Zou et al. | |
| 2022/0338241 | A1 | 10/2022 | Chin | |
| 2023/0041119 | A1 | 2/2023 | Chin et al. | |

(Continued)

FOREIGN PATENT DOCUMENTS

| | | |
|---|---|---|
| CN | 114375008 A | 4/2022 |
| JP | 2022509596 A | 1/2022 |

(Continued)

OTHER PUBLICATIONS

International Search Report and Written Opinion in International Appln. No. PCT/CN2023/093623, mailed on Dec. 21, 2023, 11 pages (with partial English translation).

(Continued)

*Primary Examiner* — Sudesh M. Patidar
(74) *Attorney, Agent, or Firm* — Fish & Richardson P.C.

(57) ABSTRACT

Disclosed are a method and apparatus for wireless communication which facilitates saving HARQ processes of a terminal device for sending uplink data via CG resources. The method includes: determining, by a terminal device, a first configured grant (CG) group, where the first CG group includes one or more CG configurations, and all the CG configurations in the first CG group correspond to a same first hybrid automatic repeat request (HARQ) process.

20 Claims, 4 Drawing Sheets

(56)     References Cited

U.S. PATENT DOCUMENTS

2023/0345473 A1 *  10/2023  Kim ...................... H04L 5/1469
2024/0073891 A1 *   2/2024  Deghel ................. H04L 1/1874
2024/0406956 A1 *  12/2024  Tsai ...................... H04L 1/1864
2025/0024432 A1 *   1/2025  Ohta ........................ H04W 4/38
2025/0280433 A1 *   9/2025  Fu .......................... H04W 28/02

FOREIGN PATENT DOCUMENTS

WO      WO 2021184266 A1    9/2021
WO      WO 2022021411 A1    2/2022
WO      WO 2023017040 A1    2/2023

OTHER PUBLICATIONS

Lenovo et al., "HARQ process configuration for configured grants,"
3GPP TSG-RAN WG2 Meeting #109e, R2-2000821, Feb. 24-Mar.
6, 2020, 2 pages.
Nokia et al., "Multiple CG configurations for XR," 3GPP TSG-
RAN WG2 Meeting #119bis Electronic, R2-2210187, Elbonia, Oct.
10-19, 2022, 2 pages.
Extended European Search Report in European Appln. No. 23936139.
7-1206, mailed on Feb. 23, 2026, 9 pages.

* cited by examiner

100

110

120  120

DCI: allocate an uplink radio resource
HARQ process identity: 2

Uplink data

S210

S220

HARQ process: 2  t

RRC: allocate an uplink radio
resource (time domain location,
frequency domain location, and
period )

Uplink data  Uplink data

S310  S320  S330

HARQ process: 2  HARQ process: 3  t

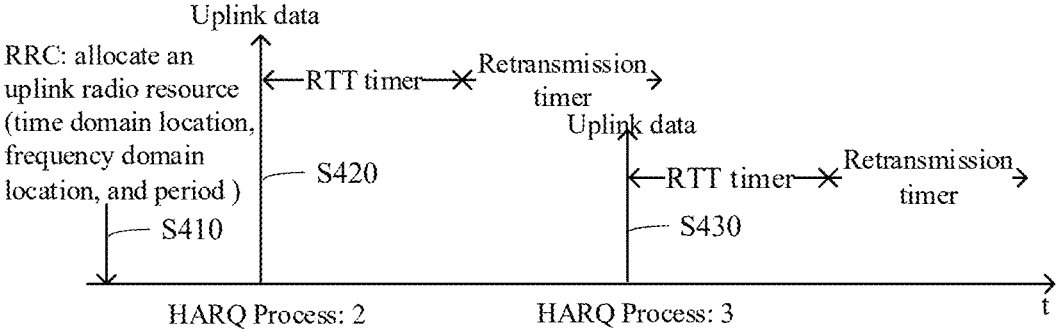
FIG. 4 (Prior Art)
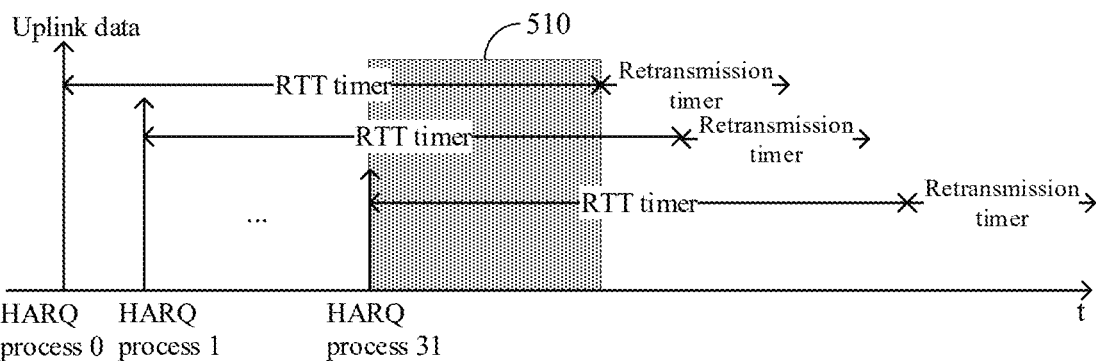
FIG. 5 (Prior Art)
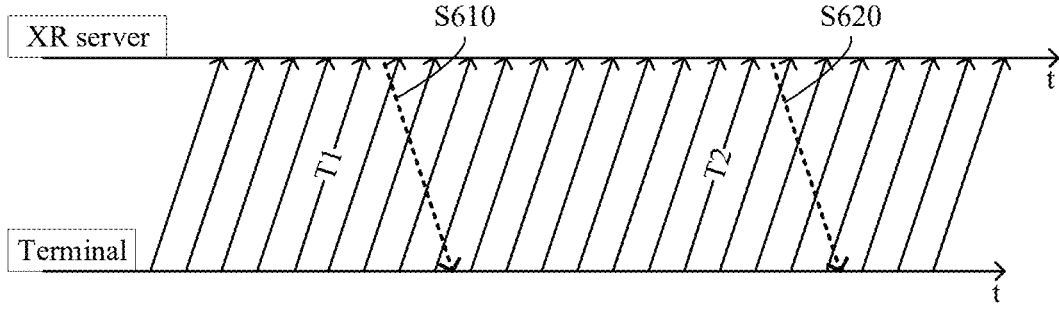
FIG. 6
A terminal device determines a first CG group          S710
FIG. 7

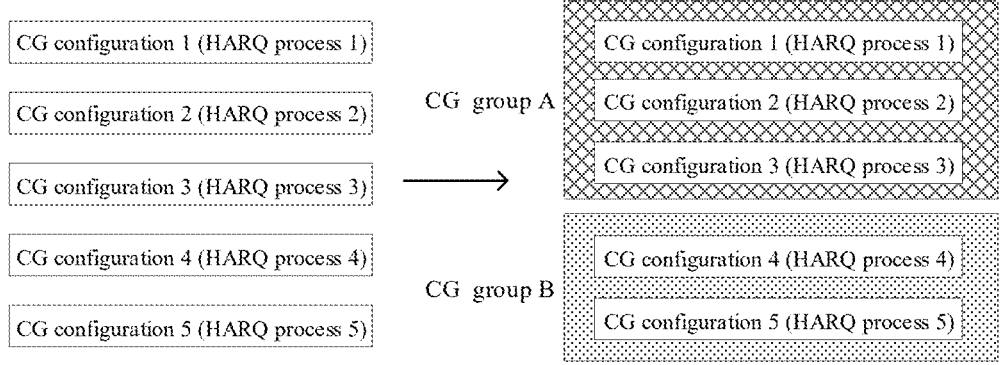
FIG. 8
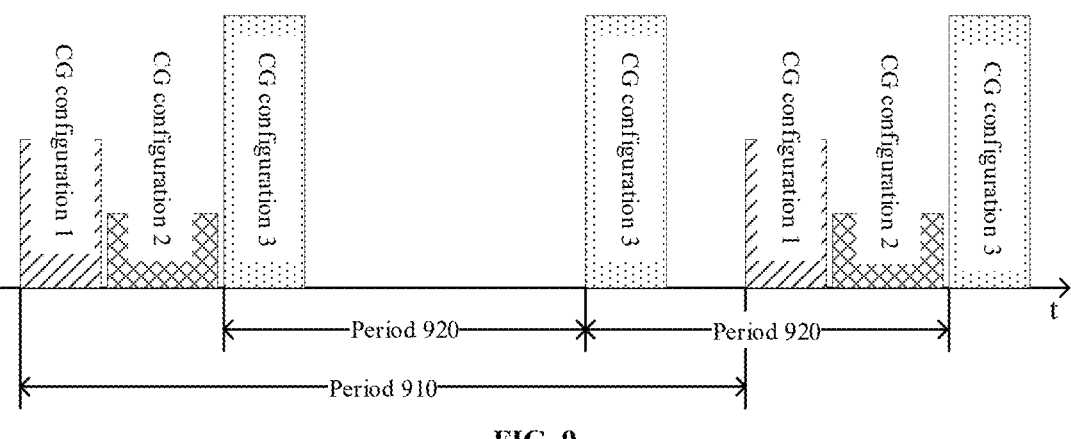
FIG. 9
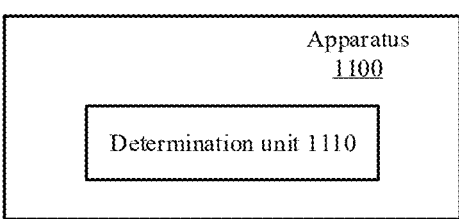
The terminal device determines a transmission condition of a first data packet sent through the first HARQ process          S1010
FIG. 10
Apparatus
1100
Determination unit 1110
FIG. 11

METHOD AND APPARATUS FOR WIRELESS COMMUNICATION

CROSS-REFERENCE TO RELATED APPLICATIONS

This application is a continuation of International Application No. PCT/CN2023/093623, filed on May 11, 2023, the disclosure of which is hereby incorporated by reference in its entirety.

TECHNICAL FIELD

The present disclosure relates to the technical field of communications, and more particularly, to a method and apparatus for wireless communication.

BACKGROUND

In a wireless communication system, a network device may preconfigure configured grant (CG) resources for a terminal device to send uplink data. The terminal device can perform data transmission through a hybrid automatic repeat request (HARQ) process according to the CG resources configured by the network device.

However, for some traffic data (e.g., pose class information of extended reality (XR) traffic), CG resources preconfigured by the network device may cause a resource waste of HARQ processes.

SUMMARY

Embodiments of the present disclosure provide a method and apparatus for wireless communication. Various aspects of the present disclosure are described below.

In a first aspect, a method for wireless communication is provided. The method includes: determining, by a terminal device, a first configured grant (CG) group, where the first CG group includes one or more CG configurations, and all the CG configurations in the first CG group correspond to a same first hybrid automatic repeat request (HARQ) process.

In a second aspect, a method for wireless communication is provided. The method includes: sending, by a network device, first configuration information to a terminal device, where the first configuration information is configured for the terminal device to determine a first configured grant (CG) group, the first CG group includes one or more CG configurations, and all the CG configurations in the first CG group correspond to a same first hybrid automatic repeat request (HARQ) process.

In a third aspect, an apparatus for wireless communication is provided. The apparatus is a terminal device including a determination unit. The determination unit is configured to determine a first configured grant (CG) group, where the first CG group includes one or more CG configurations, and all the CG configurations in the first CG group correspond to a same first hybrid automatic repeat request (HARQ) process.

In a fourth aspect, an apparatus for wireless communication is provided. The apparatus is a network device including a sending unit. The sending unit is configured to send first configuration information to the terminal device, where the first configuration information is configured for the terminal device to determine a first configured grant (CG) group, the first CG group includes one or more CG configurations, and all the CG configurations in the first CG group correspond to a same first hybrid automatic repeat request (HARQ) process.

In a fifth aspect, a communication apparatus is provided. The communication apparatus includes a memory and a processor, where the memory is configured to store a program, and the processor is configured to call the program stored in the memory to perform the method as described in any one of the first to fifth aspects.

In a sixth aspect, an apparatus is provided. The apparatus includes a processor, where the processor is configured to call a program from a memory to perform the method as described in the first or second aspect.

In a seventh aspect, a chip is provided. The chip includes a processor, where the processor is configured to call a program from a memory to cause a device equipped with the chip to perform the method as described in the first or second aspect.

In an eighth aspect, a computer-readable storage medium is provided. The computer-readable storage medium stores a program causing a computer to perform the method as described in the first or second aspect.

In a ninth aspect, a computer program product is provided. The computer program product includes a program causing a computer to perform the method as described in the first or second aspect.

In a tenth aspect, a computer program is provided. The computer program is configured to cause a computer to perform the method as described in the first or second aspect.

The terminal device in the embodiments of the present disclosure can determine a first CG group including one or more CG configurations, and a HARQ process for sending uplink data. The CG configurations in the first CG group all correspond to the first HARQ process. As can be seen, the one or more CG configurations in the first CG group can share one HARQ process, which facilitates saving the resources of the HARQ processes occupied by the CG resources.

BRIEF DESCRIPTION OF THE DRAWINGS

FIG. 4 is a schematic flowchart of running a timer associated in the configured grant.

FIG. 5 is a schematic flowchart corresponding to a longer RTT timer in FIG. 4.

FIG. 6 is a schematic flowchart of transmission of pose class information in the XR traffic.

FIG. 7 is a schematic flowchart of a method for wireless communication according to embodiments of the present disclosure.

FIG. 8 is a schematic diagram showing a comparison of the method shown in FIG. 7 with the related art.

FIG. 9 is a schematic diagram of a possible implementation of the method shown in FIG. 7.

FIG. 10 is a schematic flowchart of another method for wireless communication according to embodiments of the present disclosure.

FIG. 11 is a schematic structure diagram of an apparatus for wireless communication according to embodiments of the present disclosure.

DETAILED DESCRIPTION OF THE EMBODIMENTS

Figure 1:
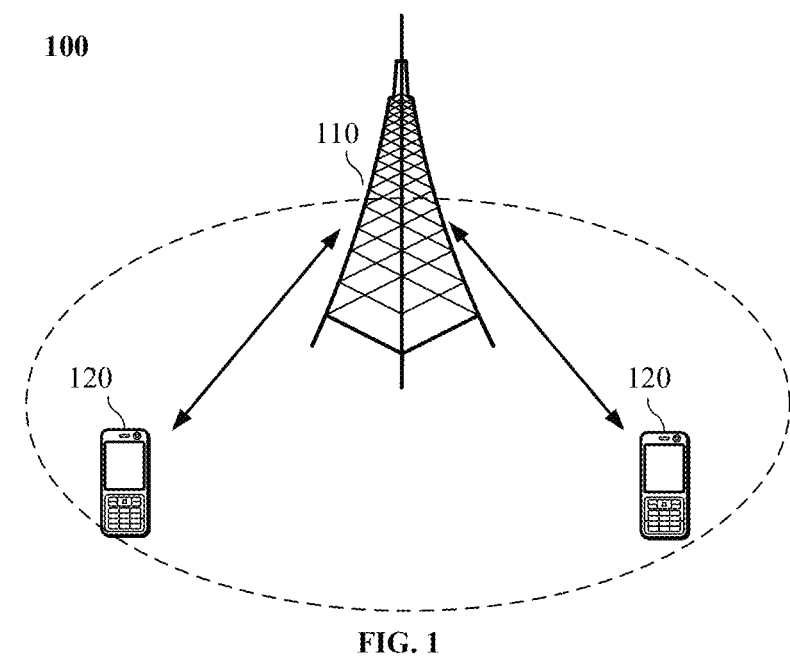
FIG. 1 is an exemplary diagram of a wireless communication system applicable to embodiments of the present disclosure.

The technical solutions in the embodiments of the present disclosure are described in detail hereinafter in conjunction with the accompanying drawings. Apparently. The described embodiments are only a part, but not all, of the embodiments of the present disclosure. For ease of understanding. With respect to the embodiments in the present disclosure, all other embodiments obtained by a person of ordinary skill in the art without making creative labour fall within the protection scope of the present disclosure.

Embodiments of the present disclosure may be applied to various communication systems. For example, the embodiments of the present disclosure may be applied to a global system of mobile communication (GSM) system, a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, an evolution system of the NR system, a LTE-based access to unlicensed spectrum (LTE-U) system, a NR-based access to unlicensed spectrum (NR-U) system, a NTN system, an universal mobile telecommunication system (UMTS), a wireless local area network (WLAN), wireless fidelity (WiFi), and a fifth-generation communication (5th-generation, 5G) system. The embodiments of the present disclosure may also be applied to other communication systems, such as a future communication system. The future communication system may for example be a 6th-generation (6G) mobile communication system, or a satellite communication system.

A conventional communication system supports a limited number of connections, which are easy to implement. However, with the development of communication technology, a communication system can support not only a conventional cellular communication, but also one or more other types of communications. For example, the communication system may support one or more of the following communications: device to device (D2D) communication, machine to machine (M2M) communication, machine type communication (MTC), enhanced MTC (eMTC), vehicle to vehicle (V2V) communication, vehicle to everything (V2X) communication and the like. The embodiments of the present disclosure may also be applied to a communication system supporting the above communications.

A communication system in the embodiments of the present disclosure may be applied in a carrier aggregation (CA) scenario, a dual connectivity (DC) scenario, and a standalone (SA) network deployment scenario.

The communication system in the embodiments of the present disclosure may be applied to unlicensed spectrum. The unlicensed spectrum may also be considered as shared spectrum. Alternatively, the communication system in the embodiments of the present disclosure may be applied to licensed spectrum. The licensed spectrum may also be considered dedicated spectrum.

The embodiments of the present disclosure may be applied to a terrestrial network (TN) system or a non-terrestrial network (NTN) system. As an example, the NTN system may include a 4G-based NTN system, a NR-based NTN system, an internet of things (IoT)-based NTN system, or a narrow band internet of things (NB-IoT)-based NTN system.

The communication system may include one or more terminal devices. The terminal device in the embodiments of the present disclosure may also be referred to as a user equipment (UE), an access terminal, a subscriber unit, a subscriber station, a mobile, a mobile station (MS), a mobile terminal (MT), a remote station, a remote terminal, a mobile device, a user terminal, a terminal, a wireless communication device, a user agent, a user apparatus, or the like.

In some embodiments, the terminal device may be a station (ST) in a WLAN. In some embodiments, the terminal device may be a cellular telephone, a cordless telephone, a session initiation protocol (SIP) telephone, a wireless local loop (WLL) station, a personal digital assistant (PDA) device, a handheld device with wireless communication function, a computing device, or another processing device connected to a wireless modem, an in-vehicle device, a wearable device, a terminal device in a next generation communication system (e.g., an NR system), or a terminal device in a future evolved public land mobile network (PLMN) network, or the like.

In some embodiments, the terminal device may refer to a device that provides voice and/or data connectivity for a user. For example, the terminal device may be a handheld device or a vehicle-mounted device having a wireless connection function. As some concrete examples, the terminal device may be a mobile phone, a pad, a laptop, a palmtop, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, or the like.

In some embodiments, the terminal device may be deployed on land. For example, the terminal device may be deployed indoors or outdoors. In some embodiments, the terminal device may be deployed on water, such as on a ship. In some embodiments, the terminal device may be deployed in the air, such as on an aircraft, a balloon, or a satellite.

In addition to the terminal device, the communication system may include one or more network devices. The network device in the embodiments of the present application may be a device for communicating with the terminal device, and may also be referred to as an access network device or a wireless access network device. The network device may be a base station, for example. The network device in the embodiments of the present disclosure may refer to a radio access network (RAN) node (or device) that accesses the terminal device to a wireless network. A base station may broadly cover various names in the following, or be substituted with the following names, such as: node B (NodeB), evolved NodeB (eNB), next generation NodeB (gNB), relay station, access point, transmitting and receiving point (TRP), transmitting point (TP), primary MeNB, secondary SeNB, multi-standard radio (MSR) node, home base station, network controller, access node, wireless node, access point (AP), transmission node, transmitting and receiving node, base band unit (BBU), remote radio unit (RRU), active antenna unit (AAU), remote radio head (RRH), central unit (CU), distributed unit (DU), positioning node and so on. The base station may be a macro base station, a micro base station, a relay node, a giver node, or the like, or a combination thereof. The base station may also refer to a communication module, modem or chip disposed within the aforementioned equipment or device. The base station may also be a mobile switching center, a device assuming a base station function in D2D, V2X, M2M communications, a network side device in a 6G network, a device assuming a base station function in a future communication system, or the like. The base station may support networks with the same or different access technologies. The embodiments of the present disclosure do not limit specific technologies and specific device form used in the network device.

The base station may be fixed or mobile. For example, a helicopter or drone may be configured to act as a mobile base station, and one or more cells may be moved according to the location of the mobile base station. In other examples, the helicopter or drone may be configured to be used as a device for communicating with another base station.

The base station may be fixed or mobile. For example, a helicopter or drone may be configured to act as a mobile base station, and one or more cells may be moved according to the location of that mobile base station. In other examples, the helicopter or drone may be configured to be used as a device for communicating with another base station.

In some deployments, the network device in the embodiments of the present disclosure may refer to a CU or a DU, or the network device includes a CU and a DU. gNB may also include an AAU.

By way of example and not as a limitation, in the embodiments of the present disclosure, the network device may have mobile characteristics. For example, the network device may be a mobile device. In some embodiments of the present disclosure, the network device may be a satellite, or a balloon station. In some embodiments of the present disclosure, the network device may also be a base station disposed on land, water, or the like.

In some embodiments of the present disclosure, the network device may provide services for a cell, and the terminal device communicates with the network device through the transmission resources (e.g., frequency domain resources, or spectrum resources) used by the cell. The cell may be a cell corresponding to the network device (e.g., a base station), and the cell may belong to a macro base station, or may belong to a base station corresponding to a small cell, where the small cell may include: metro cell, micro cell, pico cell, femto cell, etc. These small cells have characteristics of small coverage area and low transmit power, and are suitable for providing high speed data transmission services.

Exemplarily, FIG. 1 shows a schematic diagram of an architecture of a communication system according to embodiments of the present disclosure. As shown in FIG. 1, the communication system 100 may include a network device 110, and the network device 110 may be a device that communicates with a terminal device 120 (or referred to as a communication terminal or a terminal). The network device 110 may provide communication coverage for a specific geographic area and may communicate with a terminal device located within the coverage area.

FIG. 1 exemplarily illustrates one network device and two terminal devices, and in some embodiments of the present disclosure, the communication system 100 may include a plurality of network devices and may include other numbers of terminal devices within the coverage area of each of the network devices, which is not limited in the embodiments of the present disclosure.

In the embodiments of the present disclosure, the wireless communication system shown in FIG. 1 may also include a mobility management entity (MME), an access and mobility management function (AMF), and other network entities, which is not limited in the embodiments of the present disclosure.

It should be understood that a device having a communication function in the network/system in the embodiments of the present disclosure may be referred to as a communication device. Taking the communication system 100 illustrated in FIG. 1 as an example, the communication device may include a network device 110 and a terminal device 120 having a communication function, and the network device 110 and the terminal device 120 may be specific devices as described above, which are not repeated herein. The communication device may also include other devices in the communication system 100, such as a network controller, a mobile management entity, and other network entities, which is not limited in the embodiments of the present disclosure.

In order to facilitate understanding, some relevant technical knowledge involved in the embodiments of the present disclosure is first introduced. The following related technologies may be arbitrarily combined with the technical solutions of the embodiments of the present disclosure as optional solutions, which all fall within the protection scope of the embodiments of the present disclosure. The embodiments of the present disclosure include at least some of the following contents.

In a wireless communication system, a terminal device needs to acquire uplink (UL) radio resources to send uplink data to a network device. Typically, the terminal device has two methods of acquiring the uplink radio resources, namely, dynamic scheduling based on dynamic grant (DG) and pre-configured scheduling based on CG. The CG-based resource allocation method is suitable for traffic transmission with high sampling rate and constant amount of single-sampled data, for example, uplink transmission of pose class information in the XR traffic by the terminal device uplink.

The terminal device performs data transmission through an HARQ process corresponding to the uplink radio resource. That is, the terminal device may determine an allocated HARQ process based on resource scheduling of the network device. For example, the network device may preconfigure periodic CG resources for the terminal device to send uplink data. The terminal device determines the HARQ process in accordance with the CG resources configured by the network device and performs data transmission through the HARQ process.

Figure 2:
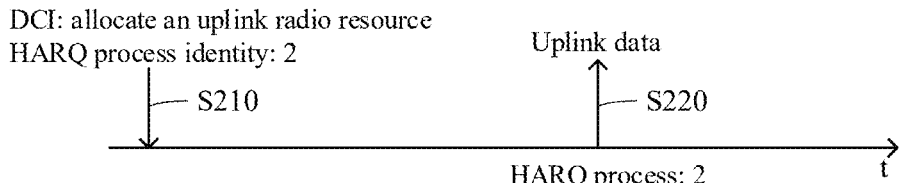
FIG. 2 is a schematic flowchart of allocating a HARQ process based on dynamic grant.
Figure 3:
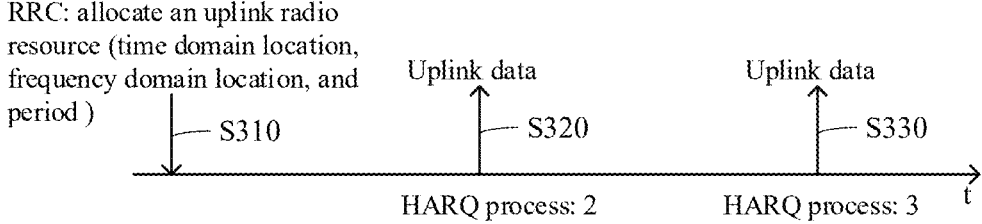
FIG. 3 is a schematic flowchart of allocating a HARQ process based on configured grant.

Corresponding to the two methods of acquiring uplink resources, there are two methods of allocating HARQ processes to the terminal device by the network device. The two methods of allocating the HARQ processes are illustrated exemplarily below in conjunction with timeline schematics shown in FIGS. 2 and 3 respectively. FIG. 2 shows the DG-based HARQ process allocation method, and FIG. 3 shows the CG-based HARQ process allocation method.

For the DG-based allocation method, the network device may allocate an uplink radio resource to the terminal device through downlink control information (DCI). The uplink radio resource allocated by one DCI allocation is valid for one time. A HARQ process identity (ID) may be included in the DCI, indicating which HARQ process is used by the terminal device to transmit uplink data.

Referring to FIG. 2, at operation S210, the network device allocates an uplink radio resource to the terminal device via the DCI. It is indicated in the DCI information that a HARQ process identity corresponding to the uplink radio resource is 2.

At operation S220, the terminal device sends uplink data via the HARQ process 2.

For the CG-based allocation method, the network device may allocate an uplink radio resource to the terminal device via a radio resource control (RRC) message. The uplink radio resource allocated by one RRC allocation is valid for multiple times. In the RRC, some parameters may be configured, which specify parameters such as time domain location, frequency domain location, period of the radio resource, and the like. The terminal device may calculate a corresponding HARQ process identity based on these parameters in conjunction with the time domain location of the uplink radio resource.

Referring to FIG. 3, at operation S310, the network device allocates an uplink radio resource to the terminal device via a RRC message. The RRC message includes parameters such as time domain location, frequency domain location, and period of the radio resource.

Through calculation with a formula, the terminal device obtains two HARQ processes that may be used to send uplink data, i.e., HARQ process 2 and HARQ process 3. The formula for calculating the HARQ process identity is for example expressed as follows:

$$\text{HARQ Process ID}=[\text{floor}(\text{CURRENT\_symbol}/\text{periodicity})] \text{ modulo nrofHARQ-Processes}.$$

In the above formula, HARQ Process ID denotes a HARQ process identity; floor ( ) denotes rounding down; CURRENT_symbol denotes a symbol at the current moment; periodicity denotes a CG period; modulo denotes modelling; and nrofHARQ-Processes denotes a number of HARQ processes for CG configuration.

At operation S320 and operation S330, the terminal device sends uplink data via the HARQ process 2 and the HARQ process 3 respectively based on the calculation results.

The methods for allocating HARQ processes to the terminal device by the network device are described above in connection with FIGS. 2 and 3. After the terminal device transmits the uplink data through the determined HARQ processes, if the network device fails to decode the uplink data, the network device allocates an uplink resource for the terminal device through the DCI. This uplink resource is configured for HARQ retransmission by the terminal device. If the terminal device is configured with discontinuous reception (DRX), the terminal device may start an associated timer after sending the uplink data. This timer is, for example, an uplink round trip time (RTT) timer. If the uplink RTT timer times out, the terminal device may further start an uplink retransmission timer.

For easy understanding, the following exemplarily describes running flows of the DRX-related timers of the terminal device in conjunction with FIG. 4. FIG. 4 takes the CG-based allocation method shown in FIG. 3 as an example, and the operations already described in FIG. 3 are not repeated.

Referring to FIG. 4, operation S410 is the same as operation S310.

At operation S420, the terminal device starts an uplink RTT timer after sending uplink data on a CG resource via the HARQ process 2, and then starts an uplink retransmission timer after the uplink RTT timer times out.

At operation S430, the terminal device starts an uplink RTT timer after sending uplink data on a CG resource through the HARQ process 3, and then starts an uplink retransmission timer after the uplink RTT timer times out.

As can be seen in FIG. 4, the uplink RTT timers and the uplink retransmission timers in different processes runs independently.

With continued reference to FIG. 4, it is not possible for the network device to allocate an uplink resource to the terminal device for retransmission of HARQ process 2 data during the running of the uplink RTT timer for the HARQ process 2. Therefore, the terminal device does not need to monitor physical downlink control channel (PDCCH) during the running of the uplink RTT timer for the HARQ process 2. During the running of the uplink retransmission timer for the HARQ process 2, the network device may allocate an uplink resource to the terminal device for retransmission of HARQ process 2 data, and thus the terminal device needs to monitor the PDCCH during the running of the uplink retransmission timer for the HARQ process 2. This also applies to the HARQ process 3 in FIG. 4. Since the terminal device independently runs the timers for each HARQ process, the terminal device does not monitor the PDCCH only if no uplink retransmission timer is running in any of the processes at the same moment. That is, as long as any one or more uplink retransmission timers are running, the terminal device monitors the PDCCH to obtain retransmission scheduling of the network device. It should be noted that the purpose of the terminal device monitoring the PDCCH is to obtain the retransmission scheduling of the network device. However, the terminal device may also obtain other scheduling of the network device, such as initial transmission scheduling.

In some cases, there may exist a situation where the terminal device needs to transmit uplink data but there is no HARQ process available. For example, in the NTN subject of NR, the uplink RTT timer needs to be extended due to too large transmission delay between the terminal and the satellite. An exact length of time that the uplink RTT timer is extended depends on the transmission delay between the satellite and the terminal device.

In such systems, uplink data is transmitted to the network device, and if the network device allocates the wireless resource to the terminal device for retransmission of the uplink data after failing to decode the uplink data, the time gap may be long. Since the terminal device does not monitor the PDCCH in the case where no retransmission timer is running, the problem of HARQ stall may occur. The following exemplarily describes the situation where there is no HARQ process available in conjunction with FIG. 5.

As shown in FIG. 5, the terminal device has 32 HARQ processes, which are HARQ process 0, HARQ process 1 . . . . , and HARQ process 31. Referring to FIG. 5, after the terminal device sends out the uplink data in sequence through all the HARQ processes, since the uplink RTT timer is too long, the earliest uplink RTT timer starting to run has not yet timed out, thus creating a shaded area 510 shown in FIG. 5. During a time period corresponding to the shaded area 510, there is no uplink retransmission timer running for any of the processes, and thus the terminal device does not monitor the PDCCH. If the terminal device has uplink data to transmit during the time period of the shaded area 510, there is no HARQ process available.

To solve the problem of no HARQ process available, HARQ mode A and HARQ mode B are introduced. All HARQ processes operate in either the HARQ mode A or the HARQ mode B depending on the configuration of the network device. For the HARQ process in the HARQ mode A, the terminal device starts the uplink RTT timer after sending out the uplink data, and starts the uplink retransmission timer after the uplink RTT timer times out. For the HARQ process in the HARQ mode B, the terminal device starts neither the uplink RTT timer nor the uplink retransmission timer after sending out the uplink data. For the HARQ process in the HARQ mode B, it is possible that the network device notifies the terminal device to transmit data with this HARQ process whenever it wants to. The network device may also notify the terminal device to retransmit data with a HARQ process X, or to transmit new data, before receiving uplink data by the HARQ process X. Thus, the introduction of the different HARQ modes solves the problem of no HARQ process available.

However, for uplink data transmitted using the HARQ process in the HARQ mode B, the transmission reliability is not as good as that of data transmitted using the HARQ process in HARQ mode A. This is because the network device does not have the mechanism of determining retransmission scheduling based on the decoding results. In order to ensure the transmission reliability of all types of traffics of the terminal device, the base station configures a parameter "transmissible with a process in HARQ mode X" for each logical channel. For a logical channel that requires high reliability, transmission may be performed only by the HARQ process in the HARQ mode A. For a logical channel that requires low reliability, transmission may be performed by either the HARQ process in the HARQ mode A or the HARQ process in the HARQ mode B.

As aforementioned, traffic information with characteristics such as frequent data and constant amount of single-sampled data is suitable to be transmitted in the CG mode. In order to meet the uplink transmission requirements of such traffic information, the network device needs to configure multiple sets of CG resources for multiple types of uplink data, where HARQ processes adopted by respective sets of CG resources must not conflict with each other, so a lot of HARQ process resources are occupied.

Taking the pose class information of XR traffic as an example, the pose class information usually includes multiple types of uplink data to be sent by the terminal device. For example, the terminal device needs to send haptic-based action data, and also needs to send related data based on spatial positions of fingers. Another example is that the terminal device needs to collect and send the rotation position of the eyeball, and also needs to send parameters such as pupil size and position. Therefore, the terminal device needs to configure multiple sets of CG resources for the XR traffic of one terminal device, thus occupying multiple HARQ processes of the terminal device.

In order to solve the above problem, taking the pose class information of the XR traffic shown in FIG. 6 as an example, the transmission process of such traffic data is analyzed. In FIG. 6, the solid line indicates uplink pose information sent by the terminal device to the XR server, and the dashed line indicates a downlink video frame sent by the XR server.

Referring to FIG. 6, the terminal device sends the pose information to the XR server with a certain period. After the pose information reaches the XR server, the XR server generates a downlink video frame based on the pose data. However, a rate at which the XR server generates the downlink video frame is much lower than a sampling rate of the Pose information. The sampling rate of the pose information corresponds to a sending rate of the uplink information. As shown in FIG. 6, during a time period in which the XR serve sends two downlink video frames, the terminal sends far more than two pieces of uplink information. In other words, the sending rate of uplink information is much higher than the sending rate of downlink video frames.

Since the generation period of the downlink video frame is much larger than the period of the uplink pose information, the XR server generates a downlink video frame based on the latest pose information. For example, at operation S610, the downlink video frame sent by the XR server is generated based on pose data identified by T1. For another example, at operation S620, the downlink video frame sent by the XR server is generated based on pose data identified by T2.

Based on the above characteristics of the pose information, it can be found that in response to transmitting the uplink pose data in the CG mode, if a certain piece of pose data is not successfully transmitted, the best strategy is not "retransmission", but "no retransmission." This is because the XR server always generates the downlink video frame based on the latest pose information, and compared with retransmitted old pose data, subsequent new pose data is more useful to the XR server. Therefore, retransmission of the pose class uplink data corresponding to the XR traffic is not needed. For the data that do not need to be retransmitted, there is no need for multiple HARQ processes.

In summary, the pose class information of XR traffic includes multiple types of uplink data, and the network device may configure multiple sets of CG resources for such information. HARQ processes adopted by respective sets of CG resources must not conflict with each other, so a lot of HARQ process resources are occupied. However, some uplink data of the pose class information does not need to be retransmitted, and HARQ processes occupied by such data may result in a waste of HARQ process resources.

It should be noted that the above-mentioned case where configuring CG resources for pose class information of XR traffic leads to a waste of HARQ process resources is only an example, and the embodiments of the present disclosure may be applied to any type of communication scenario in which sending data is generated based on the latest received data in multiple pieces of received data.

Based on this, the embodiments of the present disclosure provide a method for wireless communication. The method introduces a new way of configuring a CG with a HARQ process, which configures a CG group for CGs, and configures a HARQ process based on the CG group. This helps to save HARQ process resources occupied by the CGs. It should be noted that the embodiments of the present disclosure are based on the above analyses in conjunction with FIG. 6, and the above analyses should be regarded as part of the contribution of the present disclosure to the existing art.

The method for wireless communication provided in the embodiments of the present disclosure is described in detail below in connection with FIG. 7.

Referring to FIG. 7, at operation S710, the terminal device determines a first CG group. The first CG group includes one or more CG configurations.

The terminal device is any of the aforementioned terminal devices. The terminal device may wirelessly communicate with any of the aforementioned network devices. In some embodiments, the network device is an XR server that can generate XR data, and the terminal device is a client in communication with the XR server. In some embodiments, the terminal device may be a communication device that sends pose data to the network device, and the network device may be a communication device that sends data frames to the terminal device based on the pose data. For example, the network device is a base station, and the terminal device is a UE providing services for the base station.

The terminal device may determine the first CG group based on an explicit configuration of the network device. In some embodiments, the terminal device may receive first configuration information sent by the network device to determine the first CG group. As a possible implementation, when the network device configures multiple CG configurations for the terminal device, the first configuration information may indicate to the terminal device which CG configurations belong to one group.

In some embodiments, the first configuration information may be carried in an RRC message sent by the network device.

The terminal device may also determine the first CG group based on an implicit configuration of the network device. In some embodiments, after the manner of determining the first CG group is explicitly specified in a protocol, the terminal device may determine the first CG group based on the criterion of the protocol. That is, the terminal device may determine the first CG group according to the protocol.

The first CG set may be determined based on multiple CG configurations configured by the network device for the terminal device. In some embodiments, the first CG group may be one of multiple CG groups configured by the network device for the terminal device. As a possible implementation, the network device may divide multiple CG configurations corresponding to the terminal device into multiple CG groups. For example, when five CG configurations configured by the network device for the terminal device are CG configuration 1 to CG configuration 5, the network device may divide the five CG configurations into a first CG group and a second CG group, where the first CG group may include CG configuration 1 to CG configuration 3, and the second CG group may include CG configuration 4 and CG configuration 5.

The first CG group may include one or more CG configurations. In some embodiments, the first CG group may include multiple CG configurations with different time domain resources. That is, the multiple CG configurations in the first CG group have different transmission opportunities. In some embodiments, the first CG group may include one CG configuration. For example, when the terminal device needs to configure only one set of periodic CG resources, the first CG group may include one CG configuration.

A CG configuration in the first CG group may include a set of configuration parameters indicative of a CG resource. The CG resource corresponding to the CG configuration may be configured for transmission of a data packet. In some embodiments, each CG configuration may include information such as time domain location, frequency domain location and period as aforementioned, and may also include information about the CG group in which the CG configuration is located.

In some embodiments, CG resources corresponding to the first CG group may be resources indicated by all CG configurations in the first CG group, or may be resources indicated by some CG configurations in the first CG group. For example, all CG configurations in the first CG group may be further grouped according to a traffic type. According to the traffic type, CG resources for sending the data packet are CG resource indicated by some CG configurations corresponding to the traffic in the first CG group. As aforementioned, the network device may indicate an uplink radio resource for data transmission to the terminal device by each CG configuration. Thus, the CG resources corresponding to the first CG group may be configured for transmission of one or more type of uplink data by the terminal device.

In some embodiments, uplink data transmitted by the terminal device via the CG resources may be data with a relatively high sampling rate. That is, the uplink data may be data with a relatively high generation rate. Since the generation rate is relatively high and the receiver always utilizes the latest data packet, compared with retransmitting the old data packet, transmitting a new data packet is more meaningful. Therefore, if the uplink data fails to be transmitted via the HARQ process, a HARQ retransmission may not be performed. For example, the CG resources corresponding to the first CG group may be configured for transmission of pose packets in the XR traffic.

As a possible implementation, CG resources corresponding to the first CG group are CG resources without retransmission. As described above, data transmitted through the CG resources corresponding to the first CG group does not need to be retransmitted. Further, these CG resources may indicate the HARQ process having no retransmission in use of the HARQ process. The network device does not need to send feedback information based on the reception, and the terminal device does not need to wait for feedback through this HARQ process. In this case, this HARQ process may be configured for transmission of multiple types of uplink data. Thus, one HARQ process may correspond to multiple CG configurations in the first CG group.

In some embodiments, when the network device configures a CG group for the terminal device via the first configuration information, it may be indicated that the terminal device does not retransmit data when sending data based on the CG group. As a possible implementation, by way of configuring the CG group, the network device may indicate that the data to be transmitted by the terminal device is transmitted via CG resources. As another possible implementation, the network device may directly indicate transmission resources of the data packet by configuration parameters corresponding the CG configuration. That is, one or more CG configurations included in the first CG group may be determined based on the configuration parameters of the CG configurations.

Exemplarily, the first configuration information may indicate one CG group or may indicate multiple CG groups. In some embodiments, the first configuration information may be configured to indicate one or more CG configurations included in each of the multiple of CG groups. In some embodiments, multiple CG groups may be indicated by multiple pieces of configuration information. For example, the first configuration information may indicate CG configurations included in the first CG group, and the second configuration information may indicate CG configurations included in the second CG group. For another example, the first configuration information may indicate a first CG group, and the second configuration information may indicate some or all of the CG groups other than the first CG group.

In some embodiments, behaviors are different when performing LCP logical channel prioritization (LCP) on the terminal device side for CGs on different radio resources. As a possible implementation, the communication device may configure the characteristic of whether or not to perform HARQ retransmission for a session/data flow/data radio bearer (DRB) based on the requirements of the traffic. For example, the network device may indicate, by configuring a first configuration parameter for the session/data flow/DRB, whether the data packet corresponding to the session/data flow/DRB is transmitted using the CG resources corresponding to the first CG group.

As a possible implementation, when performing the LCP, the terminal device may determine whether a corresponding data packet is to be transmitted via a corresponding CG resource based on the characteristic of the session/data flow/DRB. For example, in performing the LCP, it may be determined based on the characteristics of the session/data flow/DRB whether the data packet can be transmitted through a CG resource without retransmission.

Exemplarily, the terminal device may determine, based on the first configuration parameter, whether the data packet to be transmitted is transmitted via a CG resource corresponding to the first CG group. That is, in the LCP, it may be determined based on the first configuration parameter whether the corresponding data packet is transmitted using a CG resource without retransmission. The first configuration parameter may include a session configuration parameter, a data flow configuration parameter, and a DRB configuration parameter. The session configuration parameter is, for example, a configuration parameter for a protocol data unit (PDU) session. The data flow configuration parameter is, for example, a configuration parameter for a quality of service (QOS) data flow.

Exemplarily, the first configuration parameter may indicate whether a data packet corresponding to the session/data flow/DRB can be transmitted by a radio resource without retransmission. For example, the first configuration parameter may be "HARQ retransmission less." If the parameter "HARQ retransmission less" corresponding to the session/data flow/DRB is TRUE, transmitting such data packet via a CG resource without retransmission may be considered in the LCP. If the parameter "HARQ retransmission less" corresponding to the session/data flow/DRB is FALSE, transmitting such data packet via a CG resource without retransmission may be not considered in the LCP.

All CG configurations in the first CG group correspond to the same first HARQ process. All the CG configurations corresponding to the same first HARQ process means that all the CG configurations share one HARQ process. In some embodiments, when the first CG group includes multiple CG configurations, the multiple CG configurations all use the first HARQ process for data transmission.

The first HARQ process is one of multiple HARQ processes available to the first CG group. For example, the first HARQ process may be one of multiple HARQ processes corresponding to multiple CG configurations in the first CG group, or may be a HARQ process that does not correspond to multiple CG configurations in the first CG group.

In some embodiments, HARQ retransmission is not performed in the first HARQ process, i.e., the first HARQ process is a HARQ process without retransmission. In transmitting a data packet through the first HARQ process, the terminal device does not perform HARQ retransmission of the data packet according to the scheduling of the network device. Therefore, the CG resource corresponding to the first CG group is an uplink CG resource without retransmission. Therefore, the CG resource corresponding to the first CG group is not configured for retransmission of the data packet.

In some embodiments, the network device may indicate, by the first configuration information, that CG configurations in the same group use one HARQ process. In other words, the network device configures, as one CG group, CG configurations that can share one HARQ process. By configuring a CG group that includes one or more CG configurations for the terminal device, the network device implements a configuration method in which multiple CG configurations share the same HARQ process, which is conducive to the efficient use of the HARQ process.

The first HARQ process corresponding to the first CG group may be explicitly configured by the network device or implicitly configured by the network device. That is, there may be multiple ways of configuring which HARQ process to be used by a CG configuration in the first CG group.

In some embodiments, when the HARQ process corresponding to the first CG group is explicitly configured by the network device, the network device may directly indicate a process identity of the first HARQ process. As a possible implementation, if explicit indication is used, the formula used in the protocol for the CG to calculate the HARQ process identity may be invalidated.

Exemplarily, the first HARQ process may be explicitly configured via an RRC message from the network device. Optionally, the network device may also explicitly configure the process identity of the first HARQ process via other messages. For example, the RRC message may directly indicate the process identity of the first HARQ process. In an embodiment, the network device may directly configure the first CG group to use a HARQ process with a process identity of 7 and the second CG group to use a HARQ process with a process identity of 9.

In some embodiments, when the HARQ process corresponding to the first CG group is implicitly configured by the network device, the implicit configuration is configured for the terminal device to determine the process identity of the first HARQ process. As a possible implementation, the configuration criterion for the implicit configuration is protocol-specified and both the network device and the terminal device are aware of this criterion. Therefore, there is no need for the network device to give an instruction to the terminal device. The terminal device may determine the HARQ process corresponding to the first CG group according to the protocol. For example, when the protocol specifies that a HARQ process corresponding to the first CG configuration in a CG group is adopted as a HARQ process corresponding to the CG group, without indication form the network device, the terminal device may determine, based on the protocol, that the first CG group adopts a HARQ process corresponding to the first CG configuration in the first CG group.

Exemplarily, the first HARQ process may be determined by one or more HARQ processes corresponding to one or more CG configurations. That is, the first HARQ process corresponding to the first CG group may be one HARQ process of multiple HARQ processes corresponding to multiple CG configurations in the first CG group. For example, when the first CG group includes multiple CG configurations, the first HARQ process may be a HARQ process corresponding to the first or last CG configuration in the first CG group. For another example, when the first CG group includes multiple CG configurations, the first HARQ process may be a HARQ process corresponding to an N-th CG configuration in the first CG group.

It should be noted that when the first HARQ process corresponding to the first CG group is determined to be a HARQ process corresponding to a certain CG configuration in the group, for other CG configurations in the first CG group, the formula used for the CG to calculate the HARQ process identity is invalidated, and the HARQ process corresponding to the first CG group may be used. For example, when the first HARQ process corresponding to the first CG group is a HARQ process corresponding to the first CG configuration, the formula used for the CG to calculate the HARQ process identity is invalidated for subsequent CG configurations. That is, the HARQ process corresponding to the first CG group is directly adapted for other CG configurations in the first CG group in addition to the first CG configuration.

Exemplarily, the first HARQ process may be determined by configuring parameters of CG configurations in the first CG group. As an implementation, HARQ process identities corresponding to CG configurations in the first CG group may be different. For example, each CG configuration may have a different HARQ process identity calculated by the aforementioned formula. As another implementation, the network device may also implicitly configure the process identity of the first HARQ process by configuring a parameter. For example, the network device may configure, by means of an existing parameter configuration, HARQ processes used by CG configurations in the group to be the same. In an embodiment, the network device may configure a parameter nrofHARQ-Processes of each CG configuration to be 1. In this case, in combination with the aforementioned calculation formula, it can be seen that the HARQ process identity corresponding to each CG configuration after the modulo calculation is 0.

In some embodiments, a CG timer is not started for the HARQ process occupied by the first CG group. As can be seen from the foregoing, the terminal device usually starts the CG timer when sending uplink data by CG resources. Since in the embodiments of the present disclosure, HARQ retransmission of data transmitted via CG resources is no longer performed, there is no need to start the CG timer for protection. For example, when the first HARQ process is used for data transmission by the terminal device via the CG resources corresponding to the first CG group, the terminal device does not start the CG timer.

In some embodiments, for the HARQ process occupied by the first CG group, a configuration value of the CG timer may be set to avoid starting the CG timer. For example, when the first HARQ process is used for data transmission by the terminal device via the CG resources corresponding to the first CG group, a configuration parameter for the CG timer may be added. In an embodiment, the terminal device may configure a value of the CG timer to be 0. That is, for the HARQ process occupied by the first CG group, the value of the CG timer may be configured to be 0.

As can be seen from FIG. 7, the first configuration information received by the terminal device may indicate one or more CG configurations in the same CG group. After a corresponding HARQ process is determined for the first CG group, the one or more CG configurations in the first CG group may directly use that HARQ process. Therefore, the terminal device can achieve the transmission of data packets corresponding to multiple CG configurations in the CG group through one HARQ process, thus saving the HARQ process.

As aforementioned, the first CG group can be one of multiple CG groups configured by the network device. For ease of understanding, in conjunction with FIG. 8 using five CG configurations as an example, the following illustratively describes the first CG group and the manner of determining the first HARQ process corresponding to the first CG group. FIG. 8 provides a schematic comparative illustration of the CG configuration manner in the related art and the enhancement introduced by the embodiments of the present disclosure.

Referring to FIG. 8, on the left side are five CG configurations in the related art, whose corresponding HARQ process identities are 1, 2, 3, 4, and 5, respectively. On the right side of FIG. 8, five CG configurations are classified into a CG group A and a CG group B using the method shown in FIG. 7.

As an example, a CG group may use a HARQ process corresponding to the first CG configuration in the CG group. That is, the CG group A uses a HARQ process 1 corresponding to the first CG configuration in the CG group A, and the CG group B uses a HARQ process 4 corresponding to the first CG configuration in the CG group B.

As another example, a CG group may also use a HARQ process corresponding to the last CG configuration in the CG group. That is, the CG group A uses a HARQ process 3 corresponding to the last CG configuration in the CG group A, and the CG group B uses a HARQ process 5 corresponding to the last CG configuration in the CG group B.

In FIG. 8, since each CG group uses only one HARQ process as the HARQ process used by the CG configurations in the CG group, other HARQ processes within the CG group are saved. For example, when the CG group A uses only the HARQ process 1, the HARQ process 2 and HARQ process 3 may be used for other data transmission.

As also aforementioned, when the first HARQ process is used for transmission on CG resources corresponding to the first CG group, data retransmission is not performed. Since retransmission of the data packet is not needed, the first HARQ process can be configured for transmit multiple types of data packets. No retransmission in the first HARQ process may be configured by the network device or may be specified by a protocol to facilitate the terminal device sending newer data through a limited number of HARQ processes.

In some embodiments, the network device may explicitly configure, via an RRC message, "no retransmission for HARQ process corresponding to CG" to the terminal device, where the CG is one or more CG configurations in the first CG group. For example, when the terminal device determines the first CG group by receiving the first configuration information sent by the network device, the first configuration information may also indicate that data retransmission is not performed in the first HARQ process. That is, the first configuration information may notify the terminal device of no need to wait for feedback information of the first HARQ process and no need to perform retransmission.

In some embodiments, the information that data retransmission is not performed in the HARQ process may also be specified by the protocol. For example, the protocol may specify that the HARQ retransmission mechanism is not adopted in the HARQ process used by CGs in a CG group. If specified by the protocol, first indication information may also be first configuration information. That is, once the first configuration information indicates a first CG group, it may be indicated that HARQ retransmission is not performed in the first HARQ process.

In the case of multiple CG configurations corresponding to different time domain locations, with the concept of CG configuration groups as described above, the same HARQ process may be used for CGs in the same group, thereby saving HARQ processes.

In some embodiments, CG resources are typically periodic, and multiple CG configurations corresponding to different time domain locations may have the same period or may have different periods. As long as the multiple CGs correspond to different transmission opportunities and do not conflict in time domain, the terminal device can perform transmission using the same HARQ process. If multiple CGs conflict in time domain, priorities may be determined, i.e., it may be determined corresponding radio resources of which CG is used for transmission in case of conflict. The specific determination of which CG to use may be configured by the RRC or specified by the protocol. For example, it is determined that a resource corresponding to the first CG is used, or a resource corresponding to a CG with the largest amount of transferable data is used, or a resource corresponding to a CG with the smallest amount of transferable data is used.

As a possible implementation, between transmission opportunities of two CG configuration with adjacent time domain locations and corresponding to the same HARQ process, the network device may allow, by dynamic scheduling, the terminal device to transmit/retransmit uplink data using the first HARQ process. That is, the network device may allow the terminal device to transmit/retransmit uplink data using the first HARQ process by dynamic scheduling between transmission opportunities of two CG configurations. Accordingly, the terminal device may transmit/retransmit the uplink data using the first HARQ process between transmission opportunities of two CG configurations with adjacent time domain locations.

It should be noted that if data dynamically scheduled by the network device has not been successfully transmitted when the next transmission opportunity corresponding to the CG configuration arrives, the network device no longer schedules the terminal device to retransmit data in the first HARQ process. In other words, the first HARQ process is preferentially used to transmit data of the next CG configuration.

For ease of understanding, taking three CG configurations having different time domain locations as an example in conjunction with FIG. 9, the following exemplarily describes window transmission conditions of data packets corresponding to the three CG configurations. The three CG configurations in FIG. 9 are CG configuration 1, CG configuration 2, and CG configuration 3.

Referring to FIG. 9, the three CGs configurations correspond to different transport block (TB) sizes and have different periods. CG Configuration 1 and CG Configuration 2 correspond to a longer period 910, and CG Configuration 3 corresponds to a shorter period 920. From FIG. 9, it can be seen that the three CG configurations correspond to different transmission opportunities, do not conflict in time domain in time domain, and thus may use the same HARQ process. The HARQ process used by the three CG configurations is, for example, HARQ process 1. Each time the transmission opportunities corresponding to CG configurations 1/2/3 are reached, the terminal device transmits new data using the HARQ process 1.

As aforementioned, when performing LCP, the terminal device can determine the transmission resources for the corresponding data packet based on the session/data flow/ DRB. For all sessions/data flows/DRBs, the first configuration parameter "HARQ retransmission less" characteristic may be configured. With continued reference to FIG. 9, when performing LCP for CG configurations 1/2/3, resources corresponding to the data packet may be determined based on the "HARQ retransmission less" characteristic of the session/data flow/DRB. If the characteristic parameter is TRUE, the corresponding data packet is considered to be transmitted via CG resources without retransmission; and if the characteristic parameter is FALSE, the corresponding data packet is not considered to be transmitted via CG resources without retransmission.

The above, in conjunction with FIGS. 7 to 9, describes the manner of determining the HARQ process based on the configuration method of the first CG group in the embodiments of the present disclosure. Since the terminal device transmits data over uplink CG resources without HARQ retransmission, multiple CG configurations in the first CG group may share one HARQ process to send data. The transmitted data may be pose data of the XR traffic. Thus, the embodiments of the present disclosure may enable the terminal device to perform uplink transmission of the pose data of the XR traffic through fewer HARQ processes, thereby saving HARQ processes.

In the related art, the network device performs HARQ feedback after receiving uplink data from the terminal device, or, the network device determines to schedule the terminal device to perform HARQ retransmission based on a result of decoding the uplink data. For example, in a 4G system, after uplink transmission, the network device indicates an acknowledgement (ACK)/negative acknowledgment (NACK) to the terminal device. Specifically, the network device indicates ACK if the decoding is successful, and NACK if the decoding fails. If the network device indicates NACK and the network device does not allocate radio resources for HARQ retransmission, the terminal device performs a non-adaptive retransmission at pre-defined uplink resources. If the network device indicates NACK and the network device has radio resources allocated for HARQ retransmission, the terminal device performs adaptive retransmission at the uplink resources allocated by the network device. For another example, in a 5G system, after uplink transmission, the network device does not indicate ACK/NACK to the terminal device. If the decoding is successful, the network device does not schedule the terminal device to perform HARQ retransmission; and if the decoding fails, the network device schedules the terminal device to perform HARQ retransmission.

However, there is no HARQ retransmission in the method shown in FIG. 7, and the network device does not allocate uplink resources for HARQ retransmission to the terminal device even if the decoding fails, so the terminal device does not know whether the uplink data is transmitted successfully.

In actual operation, if neighbouring data packets sent by the terminal device are associated with each other, it is gainful for the terminal device side to know whether the data packet is transmitted successfully when generating data. For example, if the terminal device application (APP) layer generates pose information in a way of limited coupling of a data packet and its subsequent data packet, whether the data packet is transmitted successfully may have an impact on the generation of the subsequent data packet.

Based on this, the embodiments of the present disclosure further provide a method for wireless communication. The method solves, through feedback enhancement, the problems of how the terminal device determines whether a data packet has failed to be transmitted and how the terminal device generates a subsequent data packet. The method allows for increased interaction between the access layer and the APP layer, so that the mode of data generation fits the wireless interface better. For ease of understanding, the method is described in detail below in conjunction with FIG. 10. It should be understood that the process shown in FIG. 10 is a process following the process shown in FIG. 7, and therefore, for brevity, FIG. 10 does not illustrate in detail the terms that already appear in FIG. 7.

Referring to FIG. 10, at operation S1010, the terminal device determines a transmission condition of a first data packet sent through the first HARQ process.

The first HARQ process is a HARQ process corresponding to the first CG group described above. Since HARQ retransmission is not performed in the HARQ process corresponding to the first CG group, in some embodiments, to enhance the feedback, the network device may send first indication information indicating a transmission failure to the terminal device. With this feedback enhancement, the terminal device may determine the first data packet that fails to be transmitted.

The first data packet may be one of multiple data packets sent via the first HARQ process. In some embodiments, the first data packet may be a pose data packet.

In some embodiments, the first data packet may be a data packet that is interconnected with its previous and subsequent data packets. In this case, if knowing whether uplink data is successfully transmitted, the upper layer on the terminal device side (e.g., the APP layer) may optimize the generation strategy of a subsequent data packet. Taking a pose data packet that represents a relative displacement value of a user as an example, the relative displacement value of the first data packet may be determined based on a parameter value of a previous data packet, and may also be used to determine a parameter value of a subsequent data packet. For example, when the APP layer is generating pose data, if a previous pose data packet have been received correctly, the APP layer may need to transmit only a smaller relative shift value; and if knowing that the previous pose data packet was not received correctly, the APP layer may need to transmit a larger relative displacement value.

The transmission condition of the first data packet may be a transmission success or a transmission failure. In some embodiments, the terminal device may determine the transmission condition of the first data packet based on the first indication information. The terminal device may determine the transmission condition of the first data packet by explicit indication, implicit indication, or the like.

As a possible implementation, the terminal device may determine the transmission condition of the first data packet by implicit indication. For example, the terminal device may receive first indication information sent by the network device, and if the first indication information does not contain the transmission condition of the first data packet, the terminal device may determine that the first data packet is successfully transmitted or fails to be transmitted.

As another possible implementation, the first indication information sent by the network device may be configured to explicitly indicate the transmission condition of the first data packet. For example, the first indication information may directly indicate that the first data packet is successfully transmitted or the first data packet fails to be transmitted.

In some embodiments, the first indication information sent by the network device to the terminal device may indicate only a data packet that failed to be transmitted, and does not indicate a data packet that is successfully transmitted. That is, the indication is performed only in the case of a transmission failure. In this case, the first indication information may indicate to the terminal device that the data decoding failed. If the data decoding is successful, the network device does not send first indication information. For example, the network device (e.g., a 5G base station) may send first indication information to the terminal device if failing to receive data transmitted by the CG.

In some embodiments, the first indication information sent by the network device to the terminal device may indicate only a data packet that is successfully transmitted, and does not indicate a data packet that failed to be transmitted. That is, the indication is performed only in the case of a transmission success. In this case, the first indication information may indicate to the terminal device that the data decoding is successful. If the data decoding fails, the network device does not send the first indication information. For example, the network device may indicate, to the terminal device via the first indication information, a data packet that is successfully transmitted.

In some embodiments, the network device may indicate regardless of a transmission failure or a transmission success. That is, the network device may indicate all decoding results to the terminal device via the first indication information. In this case, in response to a successful decoding, the network device indicates a successful data transmission via the first indication message, and in response to a failed decoding, the network device indicates a failed data transmission via the first indication information. For example, the first indication information may indicate a data packet that is successfully transmitted and a data packet that failed to be transmitted separately.

In some embodiments, the first indication information may further be configured to schedule the terminal device to perform HARQ retransmission. It should be noted that the terminal device may not perform the HARQ retransmission after receiving this scheduling notification. Optionally, the terminal device may notify the upper layer of the transmission condition of the corresponding data packet.

As a possible implementation, the first indication information may be carried in DCI. That is, the network device may notify the terminal device to perform HARQ retransmission via DCI schedule after a decoding failure. The DCI may also allocate a radio resource corresponding to the retransmission to the terminal device. The radio resource may be a virtual uplink resource allocated or an arbitrary uplink resource allocated by the network device. Since the terminal device does not perform HARQ retransmission, this radio resource may be configured for data transmission other than HARQ retransmission of the first data packet. For example, the network device may allocate the radio resource for use by other terminal devices.

Exemplarily, the network device and the terminal device may agree on the radio resource to ensure that the radio resource is used for other data transmissions or for other terminal devices. For example, the network device and the terminal device may agree that "if a CG uses HARQ process X, for the first DCI that schedules the HARQ process X for retransmission after the CG, radio resources indicated in the DCI are not used for retransmission." With similar conventions made, radio resources in the DCI may be allocated to other terminal devices.

The terminal device may determine second indication information based on the transmission condition of the first data packet and notify the second indication information to the upper layer. The upper layer may be an application layer or a layer above the physical layer.

The second indication information may be configured to explicitly or implicitly indicate the transmission condition of the first data packet. In some embodiments, the second indication information may be configured to explicitly indicate the transmission condition of the first data packet. For example, the second indication information may directly indicate to the upper layer a transmission success or a transmission failure of the first data packet. In some embodiments, the second indication information may be configured to implicitly indicate the transmission condition of the first data packet. For example, in the case where the second indication information includes the first data packet, the second indication information may indicate a transmission success or a transmission failure of the first data packet.

In some embodiments, the second indication information may be determined based on the first indication information. For example, when both the second indication information and the first indication information indicate a data packet that fails to be transmitted, the second indication information may have the same contents as the first indication information. For another example, when the second indication information indicates a data packet that fails to be transmitted and the first indication information indicates a data packet that is successfully transmitted, the second indication information may determine the data packet that is successfully transmitted based on the content of the first indication information first, and then indicate to the upper layer.

In some embodiments, the terminal device may send the second indication information to the upper layer via an access layer. The access layer may send specific indication contents via an interlayer primitive.

As a possible implementation, the second indication information sent by the access layer to the upper layer may indicate only the data packet that fails to be transmitted, and do not indicate the data packet that is successfully transmitted. That is, the indication is performed only in the case of a transmission failure. In this case, the second indication information may indicate to the upper layer that the data decoding fails. If the data decoding is successful, the access layer does not send second indication information. For example, the access layer (e.g., a 5G base station) may send second indication information to the upper layer if failing to receive the data transmitted by the CG.

As a possible implementation, the second indication information sent by the access layer to the upper layer may indicate only the data packet that is successfully transmitted and does not indicate the data packet that fails to be transmitted. That is, the indication is performed only in the case of a transmission success. In this case, the second indication information may indicate to the upper layer that the data decoding is successful. If the data decoding fails, the access layer does not send the second indication information. For example, the access layer may indicate, to the upper layer via the second indication information, the data packet that is successfully transmitted.

As a possible implementation, the access layer may indicate to the upper layer regardless of a transmission success or a transmission failure. That is, the access layer may indicate all decoding results to the upper layer via the second indication information. In this case, in response to a successful decoding, the access layer indicates a successful data transmission via the second indication information, and in response to a failed decoding, the access layer indicates a failed data transmission via the second indication information. For example, the second indication information may indicate a data packet that is successfully transmitted and a data packet that fails to be transmitted separately.

It should be understood that the second indication information and the first indication information may be indicated in different ways or in the same way, which is not limited in the present disclosure. For example, the first indication information sent by the network device to the terminal device indicates only a failure and does not indicates a success, and the second indication information sent by the terminal device to the upper layer via the access layer may indicate only a success and does not indicates a failure. Of course, other combinations are possible.

In some embodiments, when the network device notifies the terminal device to perform HARQ retransmission via DCI scheduling, the terminal device may notify the upper layer of this information. Compared with the HARQ mode B described above, the HARQ process in the embodiments of the present disclosure does not wait for the network device to schedule the HARQ retransmission after performing initial data transmission. Even if the terminal device receives the scheduling of HARQ retransmission, the terminal device does not perform HARQ retransmission, but indicates or explicitly indicates to the upper layer that the transmission is unsuccessful, for the APP layer to optimize the generation strategy of a subsequent data packet.

The second indication information may further be configured for the upper layer to determine a generation strategy of the second data packet. The second data packet being associated with the first data packet indicates that the content of the second data packet is interrelated with the content of the first data packet. For example, the data of the second data packet may have limited coupling with the data of the second data packet. For another example, the data of the second data packet may be determined based on the first data packet. If the first data packet fails to be transmitted, a generation strategy of the second data packet needs to be reconsidered.

Exemplarily, the first data packet and the second data packet may be pose data. By means of relevant information in the first data packet in the second indication information, the pose generation strategy of the XR client on the terminal device side may be optimized, so as to achieve the purpose of transmitting the pose data quickly and improving the user experience.

As a possible implementation, the second indication information may include one or more of the following information: a sequence number of the first data packet; a content of the first data packet; and information in a GTP related to the first data packet.

Exemplarily, upon receiving an indication from the network device that the CG transmission is unsuccessful, the terminal device may further determine the sequence number of the first data packet transmitted in the CG. The terminal device may indicate the sequence number to the upper layer, thereby informing precisely the upper layer which data packet or data packets are not successfully transmitted.

Exemplarily, the access layer of the terminal device may also indicate other information in the first data packet to the upper layer. For example, the terminal device may also indicate to the upper layer information in a general packet radio service tunneling protocol (GTP) header encapsulating the first data packet.

Exemplarily, the terminal device may also directly indicate the content of the first data packet to the upper layer for the upper layer to optimize the generation strategy of the data packet. For example, when the first data packet is a pose data packet indicating a relative displacement value of a user, the terminal device may directly send the parameters of the first data packet to the upper layer for the upper layer to generate a value of the second data packet.

The aforementioned act of the terminal device informing the upper layer of the transmission condition of the first data packet and/or the terminal device informing the upper layer of the generation strategy of the second data packet may be configured in a variety of ways. In some embodiments, the terminal device may send the second indication information to the upper layer via the access layer. The act of the access layer sending the indication to the upper layer may be configured in a variety of ways. Exemplarily, when the act of the access layer sending the indication to the upper layer is configured via an RRC message, the network device may indicate to the terminal device via the RRC message whether and when the access layer is to send the indication to the upper layer. For example, the RRC message may configure the access layer to send the indication to the upper layer in response to a transmission success, or to send the indication to the upper layer in response to a transmission failure.

As a possible implementation, the access layer may be configured to send the indication according to one or more of the following: an RRC message, a media access control control element (MAC CE) indication, a non-access stratum (NAS) signalling, and an application layer of the terminal device. Exemplarily, the application layer of the terminal device may determine to indicate to the upper layer, and then notify the access layer of the terminal device to perform. Exemplarily, the network device may configure the terminal device to send the second indication information to the upper layer via the access layer in one or more ways. For example, the network device may perform the configuration via an RRC message. For another example, the network device may perform the indication via a MAC CE. For another example, the configuration may be performed by a core network via NAS signalling.

As can be seen from FIG. 10, after the terminal device notifies the upper layer of information about the first data packet that failed to be transmitted, the terminal device may determine a generation strategy of the second data packet based on the correlation between the first data packet and the subsequent data packet. In this way, the data generation strategy on the terminal device side is optimized, so that data can be transmitted quickly and user experience can be improved.

The method embodiments of the present disclosure are described in detail above in conjunction with FIGS. 1 to 10. Device embodiments of the present disclosure are described in detail below in conjunction with FIGS. 11 to 13. It should be understood that the description of the device embodiments and the description of the method embodiments correspond to each other, and therefore, parts not described in detail in the device embodiments may be referred to the preceding method embodiments.

FIG. 11 is a schematic block diagram of an apparatus for wireless communication of the embodiments of the present disclosure. The apparatus 1100 may be any of the terminal devices described above. The apparatus 1100 shown in FIG. 11 includes a determination unit 1110.

The determination unit 1110 may be configured to determine a first CG group, where the first CG group includes one or more CG configurations, and all the CG configurations in the first CG group correspond to the same first HARQ process.

Optionally, HARQ retransmissions is not performed in the first HARQ process.

Optionally, the terminal device 1100 further includes a receiving unit configured to receive first configuration information sent by the network device, the first configuration information being used by the terminal device to determine the first CG group.

Optionally, the first configuration information is carried in an RRC message of the network device.

Optionally, the determining unit 1110 is further configured to determine the first CG group according to a protocol.

Optionally, the first HARQ process is configured via an RRC message of the network device, where the RRC message is configured to indicate a process identity of the first HARQ process.

Optionally, the first CG group includes multiple CG configurations, and the first HARQ process is one HARQ process of multiple HARQ processes corresponding to the multiple CG configurations.

Optionally, the first HARQ process is configured for the terminal device to perform data transmission through a CG resource corresponding to the first CG group, and the terminal device 1100 further includes a timing unit. The timing unit may be configured to not start a CG timer in performing data transmission, or to set a value of the CG timer to 0.

Optionally, the determining unit 1100 is further configured to determine, based on a first configuration parameter of a session/data flow/DRB, whether a data packet corresponding to the session/data flow/DRB is to be transmitted through the CG resource corresponding to the first CG group.

Optionally, the first configuration parameter is configured to indicate whether the data packet corresponding to the session/data flow/DRB is transmitted via a radio resource without retransmission.

Optionally, the determining unit 1110 is further configured to determine a transmission condition of a first data packet sent through the first HARQ process.

Optionally, the determining unit 1110 is further configured to determine the transmission condition of the first data packet based on first indication information, where the first indication information is indicated by way of an explicit indication or an implicit indication.

Optionally, the first indication information is also configured to schedule HARQ retransmission corresponding to the first data packet, and the terminal device 1100 further includes an execution unit. The execution unit may be configured to not perform the HARQ retransmission.

Optionally, the determining unit 1110 is further configured to determine second indication information based on the transmission condition of the first data packet. The terminal device 1100 further includes a notification unit. The notification unit may be configured to notify the second indication information to the upper layer, where the second indication information is configured to explicitly or implicitly indicate the first transmission condition of the data packet.

Optionally, the second indication information is further configured for the upper layer to determine a generation strategy of the second data packet, where the second data packet is related to the first data packet.

Optionally, the second indication information includes one or more of the following information: a sequence number of the first data packet; a content of the first data packet; and information in a GTP associated with the first data packet.

Optionally, the notification unit is further configured to send the second indication information to the upper layer via an access layer, where the access layer is configured to send the second indication information according to one or more of the following: an RRC message, a MAC CE, a NAS signalling, and an application layer of the terminal device.

Optionally, the CG resource corresponding to the first CG group is configured to transmit a pose data packet.

Figure 12:
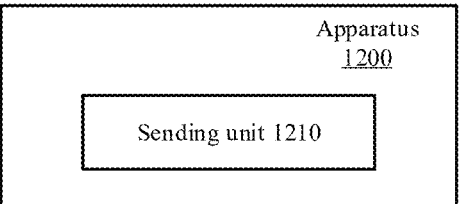
FIG. 12 is a schematic structure diagram of another apparatus for wireless communication according to embodiments of the present disclosure.

FIG. 12 is a schematic block diagram of another apparatus for wireless communication of embodiments of the present disclosure. The apparatus 1200 may be any of the network devices described above. The network device 1200 shown in FIG. 12 includes a sending unit 1210.

The sending unit 1210 may be configured to send first configuration information to the terminal device, where the first configuration information is configured for the terminal device to determine a first CG group, the first CG group includes one or more CG configurations, and all the CG configurations in the first CG group correspond to the same first HARQ process.

Optionally, HARQ retransmission is not performed in the first HARQ process.

Optionally, the first configuration information is carried in an RRC message of the network device.

Optionally, the first HARQ process is configured via an RRC message of the network device, where the RRC message is configured to indicate a process identity of the first HARQ process.

Optionally, the first CG group includes multiple CG configurations, and the first HARQ process is one HARQ process of multiple HARQ processes corresponding to the multiple CG configurations.

Optionally, the network device 1200 further includes a first configuration unit. The first configuration unit may be configured to configure a first configuration parameter of the session/data flow/DRB, and the first configuration parameter is configured for the terminal device to determine whether a data packet corresponding to the session/data flow/DRB is to be transmitted through a CG resource corresponding to the first CG group.

Optionally, the first configuration parameter is configured to indicate whether the data packet corresponding to the session/data flow/DRB is transmitted through a radio resource without retransmission.

Optionally, the sending unit is further configured to send first indication information to the terminal device, where the first indication information is configured to indicate to the terminal device a transmission condition of the first data packet sent through the first HARQ process.

Optionally, the transmission condition of the first data packet is configured for the terminal device to determine the second indication information. The network device 1200 further includes a second configuration unit. The second configuration unit may be configured to configure the terminal device to send, via the access layer, second indication information to the upper layer by one or more of the following: an RRC message, a MAC CE, and a NAS signalling.

Optionally, the CG resource corresponding to the first CG group is configured to transmit a pose data packet.

Figure 13:
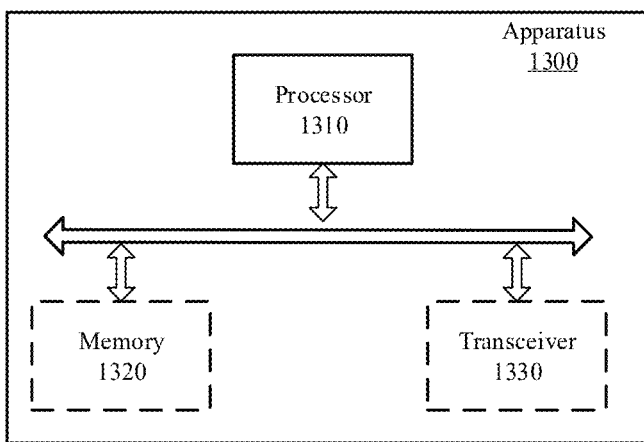
FIG. 13 is a schematic structure diagram of a communication apparatus according to embodiments of the present disclosure.

FIG. 13 is a schematic structure diagram of a communication apparatus of embodiments of the present disclosure. The dotted line in FIG. 13 indicates that the unit or module is optional. The apparatus 1300 may be configured to implement the methods described in the preceding method embodiments. The apparatus 1300 may be a chip, terminal device or network device.

The apparatus 1300 may include one or more processors 1310. The processor 1310 may support the apparatus 1300 in implementing the methods described in the preceding method embodiments. The processor 1310 may be a general purpose processor or a dedicated processor. For example, the processor may be a central processing unit (CPU). Alternatively, the processor may be another general purpose processor, a digital signal processor (DSP), an application specific integrated circuit (ASIC), a field programmable gate array (FPGA) or another programmable logic device, a discrete gate or transistor logic device, or a discrete hardware component, or the like. The general-purpose processor may be a microprocessor or any customary processor or the like.

The apparatus 1300 may further include one or more memories 1320. The memory 1320 has stored thereon a program that is executable by the processor 1310 to cause the processor 1310 to perform the method described in the preceding method embodiments. The memory 1320 may be separate from the processor 1310 or integrated within the processor 1310.

The apparatus 1300 may further include a transceiver 1330. The processor 1310 may communicate with another device or a chip by the transceiver 1330. For example, the processor 1310 may transmit data to, or receive data from, another device or a chip by the transceiver 1330.

Some embodiments of the present disclosure further provide a computer-readable storage medium configured to store a program. The computer-readable storage medium may be applied to a terminal device or a network device according to the embodiments of the present disclosure, and the program causes a computer to perform the method performed by the terminal device or the network device according to the respective embodiments of the present disclosure.

The computer-readable storage medium may be any usable medium that is computer-readable or a data storage device such as a server or a data center that includes one or more usable media integrated. The usable medium may be a magnetic medium (e.g., a floppy disk, a hard disk and a tape), an optical medium (e.g., a digital video disc (DVD)), a semiconductor medium (e.g., a solid state disk (SSD)), or the like.

Some embodiments of the present disclosure further provide a computer program product. The computer program product includes a program. The computer program product may be applied to a terminal device or a network device according to the embodiments of the present disclosure, and the program causes a computer to perform the method performed by the terminal device or the network device according to the respective embodiments of the present disclosure.

In the embodiments described above, the technical solutions may be totally or partially practiced by software, hardware, firmware or any combination thereof. During practice by software, the technical solutions may be totally or partially implemented in the form of a computer program product. The computer program product includes one or more computer instructions. Loading and executing the computer instructions on a computer produces, in whole or in part, a process or function in accordance with the embodiments of the present disclosure. The computer may be a general purpose computer, a special purpose computer, a computer network, or other programmable device. The computer instructions may be stored in a computer-readable storage medium or transmitted from one computer-readable storage medium to another computer-readable storage medium. For example, the computer instructions may be transmitted from a web site, computer, server, or data center to another website site, computer, server or data center via a wired means (e.g., coaxial cable, fiber optic and digital subscriber line (DSL)) or a wireless means (e.g., infrared, wireless and microwave).

Some embodiments of the present disclosure further provide a computer program. The computer program may be applied to a terminal device or a network device according to the embodiments of the present disclosure, and the computer program causes a computer to perform the method performed by the terminal device or the network device according to the respective embodiments of the present disclosure.

It should be understood that the terms "system" and "network" in the specification are generally exchanged. Further, the terms used herein are for the purpose of describing particular embodiments only and are not intended to limit the present disclosure. The terms such as "first," "second," "third," "fourth," and the like in the specifications, claims and the accompanying drawings of the present disclosure are intended to distinguishing different objects but are not intended to define a specific sequence. In addition, terms "comprise," "include," and variations thereof are intended to define a non-exclusive meaning.

In the embodiments of the present disclosure, "an indication" mentioned in the specification may be a direct indication, an indirect indication, or an association. By way of example, A indicates B, which can mean that A directly indicates B, e.g., B can be obtained by A; can also indicate that A indicates B indirectly, for example A indicates C, and B can be obtained by C; it can also be shown that there is an association between A and B.

In the embodiments of the present disclosure, the term "correspond" may mean that there is a direct correspondence or an indirect correspondence between the two, that there is a correlation between the two, or that there is a relationship between indicating and being indicated, configuring and being configured, or the like.

In embodiments of the present disclosure, "predefined" or "pre-configured" may be implemented by pre-storing a corresponding code, table, or other means that may be used to indicate relevant information in a device (e.g., including a terminal device and a network device), and the present disclosure does not limit the specific implementation thereof. For example, the term "predefined" may refer to "defined in the protocol."

In the embodiments of the present disclosure, the term "protocol" may refer to a standard protocol in the field of communications, and may include, for example, the LTE protocol, the NR protocol, and related protocols used in future communication systems, without limitation.

In the embodiments of the present disclosure, determining B from A does not mean determining B from A alone, and B may also be determined from A and/or other information.

In the embodiments of the present disclosure, the term "and/or" is merely an association relationship for describing associated objects, which represents that there may exist three types of relationships, for example, A and/or B may represent three situations: only A exists, both A and B exist, and only B exists. In addition, the forward-slash symbol "/" generally represents an "or" relationship between associated objects before and after the symbol.

In various embodiments of the present disclosure, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present disclosure.

In the several embodiments provided in the present disclosure, it should be understood that the disclosed system, apparatus and method may be practiced in other manners. The above described device embodiments are merely illustrative. For example, the unit division is merely logical function division and may be other divisions in actual practice. For example, multiple units or components may be combined or integrated into another device, or some features can be ignored or not performed. In addition, the displayed or discussed mutual couplings or direct couplings or communication connections may be implemented through some interfaces. The indirect couplings or communication connections between the devices or units may be implemented in electronic, mechanical or other forms.

The units which are described as separate components may be physically separated or may be not physically separated, and the components which are illustrated as units may be or may not be physical units, that is, the components may be located in the same location or may be distributed into a plurality of network units. Some or all of the units may be selected according to actual needs to achieve the objectives of the solutions of the embodiments.

In addition, functional units in the embodiments of the present disclosure may be integrated into one processing unit, or each of the units may exist along physically, or two or more units may be integrated into one unit.

The above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the appended claims.

What is claimed is:

1. A method for wireless communication, comprising:
determining, by a terminal device, a first configured grant (CG) group, wherein the first CG group includes one or more CG configurations, and the one or more CG configurations in the first CG group correspond to a same first hybrid automatic repeat request (HARQ) process, wherein the determining the first CG group comprises: receiving, from a network device via a radio resource control (RRC) message, first configuration information that indicates the first CG group; and
in response to the first HARQ process being configured for the terminal device to perform data transmission through a CG resource corresponding to the first CG group, refraining from starting, by the terminal device, a CG timer in performing data transmission, wherein HARQ retransmission is not performed in the first HARQ process.

2. The method according to claim 1, wherein the first HARQ process is configured by an RRC message, and the RRC message indicates a process identity of the first HARQ process.

3. The method according to claim 1, wherein the first CG group includes a plurality of CG configurations, and the first HARQ process is one of a plurality of HARQ processes corresponding to the plurality of CG configurations.

4. The method according to claim 1, wherein the method further comprises:
determining, by the terminal device, whether a data packet corresponding to at least one of a session, a data flow, or a data radio bearer (DRB) is transmitted through a CG resource corresponding to the first CG group based on a first configuration parameter of the at least one of the session, the data flow, or the DRB.

5. The method according to claim 4, wherein the first configuration parameter is configured to indicate whether the data packet corresponding to the at least one of the session, the data flow, or the DRB is transmitted through a radio resource without retransmission.

6. The method according to claim 1, wherein the method further comprises:
determining, by the terminal device, a transmission condition of a first data packet sent through the first HARQ process.

7. The method according to claim 6, wherein the method further comprises:

determining, by the terminal device, the transmission condition of the first data packet based on first indication information.

8. The method according to claim 7, wherein the first indication information is further configured for scheduling of a HARQ retransmission corresponding to the first data packet, and the method further comprises:

not performing, by the terminal device, the HARQ retransmission.

9. The method according to claim 1, wherein second indication information includes at least one of the following information:

a sequence number of a first data packet;

a content of the first data packet; or information in a general packet radio service tunneling protocol (GTP) associated with the first data packet.

10. The method according to claim 1, wherein a CG resource corresponding to the first CG group is configured for transmission of a pose data packet.

11. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

determining a first configured grant (CG) group, wherein the first CG group includes one or more CG configurations, and the one or more CG configurations in the first CG group correspond to a same first hybrid automatic repeat request (HARQ) process, wherein the determining the first CG group comprises: receiving, from a network device via a radio resource control (RRC) message, first configuration information that indicates the first CG group; and in response to the first HARQ process being configured for the apparatus to perform data transmission through a CG resource corresponding to the first CG group, refraining from starting a CG timer in performing data transmission, wherein HARQ retransmission is not performed in the first HARQ process.

12. The apparatus according to claim 11, wherein the first HARQ process is configured by an RRC message, and the RRC message indicates a process identity of the first HARQ process.

13. The apparatus according to claim 11, wherein the first CG group includes a plurality of CG configurations, and the first HARQ process is one of a plurality of HARQ processes corresponding to the plurality of CG configurations.

14. The apparatus according to claim 11, wherein the operations further comprise:

determining whether a data packet corresponding to at least one of a session, a data flow, or a data radio bearer (DRB) is transmitted through a CG resource corresponding to the first CG group based on a first configuration parameter of the at least one of the session, the data flow, or the DRB.

15. The apparatus according to claim 14, wherein the first configuration parameter is configured to indicate whether the data packet corresponding to the at least one of the session, the data flow, or the DRB is transmitted through a radio resource without retransmission.

16. The apparatus according to claim 11, wherein the operations further comprise:

determining a transmission condition of a first data packet sent through the first HARQ process.

17. The apparatus according to claim 16, wherein the operations comprise:

determining the transmission condition of the first data packet based on first indication information.

18. The apparatus according to claim 11, wherein a CG resource corresponding to the first CG group is configured for transmission of a pose data packet.

19. The apparatus according to claim 11, wherein second indication information includes at least one of the following information:

a sequence number of a first data packet;

a content of the first data packet; or information in a general packet radio service tunneling protocol (GTP) associated with the first data packet.

20. One or more non-transitory computer-readable media storing computer instructions, that when executed by one or more processors, cause a computing device to perform operations comprising:

determining a first configured grant (CG) group, wherein the first CG group includes one or more CG configurations, and the one or more CG configurations in the first CG group correspond to a same first hybrid automatic repeat request (HARQ) process, wherein the determining the first CG group comprises: receiving, from a network device via a radio resource control (RRC) message, first configuration information that indicates the first CG group; and in response to the first HARQ process being configured for a terminal device to perform data transmission through a CG resource corresponding to the first CG group, refraining from starting, by the terminal device, a CG timer in performing data transmission, wherein HARQ retransmission is not performed in the first HARQ process.

* * * * *